United States Patent [19]
Voss

[11] 4,163,582
[45] Aug. 7, 1979

[54] PNEUMATIC STOWING APPARATUS
[75] Inventor: Kurt H. Voss, Hattingen, Fed. Rep. of Germany
[73] Assignee: Bergwerksverband GmbH, Essen, Fed. Rep. of Germany
[21] Appl. No.: 867,511
[22] Filed: Jan. 6, 1978
[30] Foreign Application Priority Data
Jan. 8, 1977 [DE] Fed. Rep. of Germany ....... 2700675
Apr. 1, 1977 [DE] Fed. Rep. of Germany ....... 2714619
[51] Int. Cl.² .............................................. B65G 53/46
[52] U.S. Cl. ....................................... 406/12; 406/74; 406/63
[58] Field of Search ........................ 302/26, 41, 44, 49; 222/194, 276; 221/278

[56] References Cited
U.S. PATENT DOCUMENTS

| 438,173 | 10/1890 | Pankhurst | 302/52 |
| 3,272,396 | 9/1966 | Neville, Jr. | 222/194 |
| 3,281,022 | 10/1966 | De Jarnett | 222/194 |
| 3,386,774 | 6/1968 | Strydom | 302/49 |
| 3,411,827 | 11/1968 | Rupert | 302/49 |
| 3,797,709 | 3/1974 | Ivanovich | 222/194 |

FOREIGN PATENT DOCUMENTS
433079 5/1975 U.S.S.R. ................................... 302/49

Primary Examiner—Jeffrey V. Nase
Attorney, Agent, or Firm—Michael J. Striker

[57] ABSTRACT

A pneumatic stowing apparatus for use in underground mine galleries for pneumatically transporting mine waste resulting from blasting operations, mainly comprises a housing in which an element forming at least one chamber is movable between a material receiving position in which such mine waste is filled through an inlet opening in the housing into the chamber and a material-discharging position in which opposite open ends of the chamber are respectively aligned with openings in opposite end walls of the housing, through one of which compressed air is blown over a valve into the chamber so that the mine waste in the latter is transported to a point of use through a discharge conduit connected to the opening in the opposite end wall of the housing, a motor to move the chamber forming element between the positions thereof, and a member for opening and closing the valve in timed sequence with the movement of the chamber forming element.

15 Claims, 6 Drawing Figures

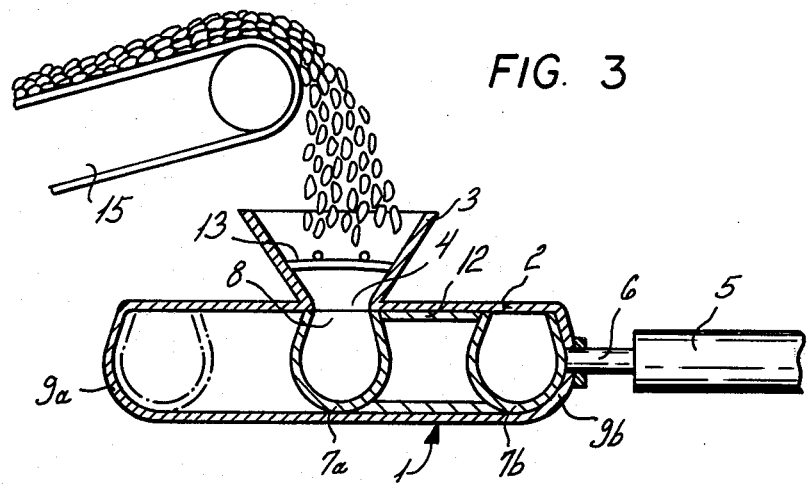
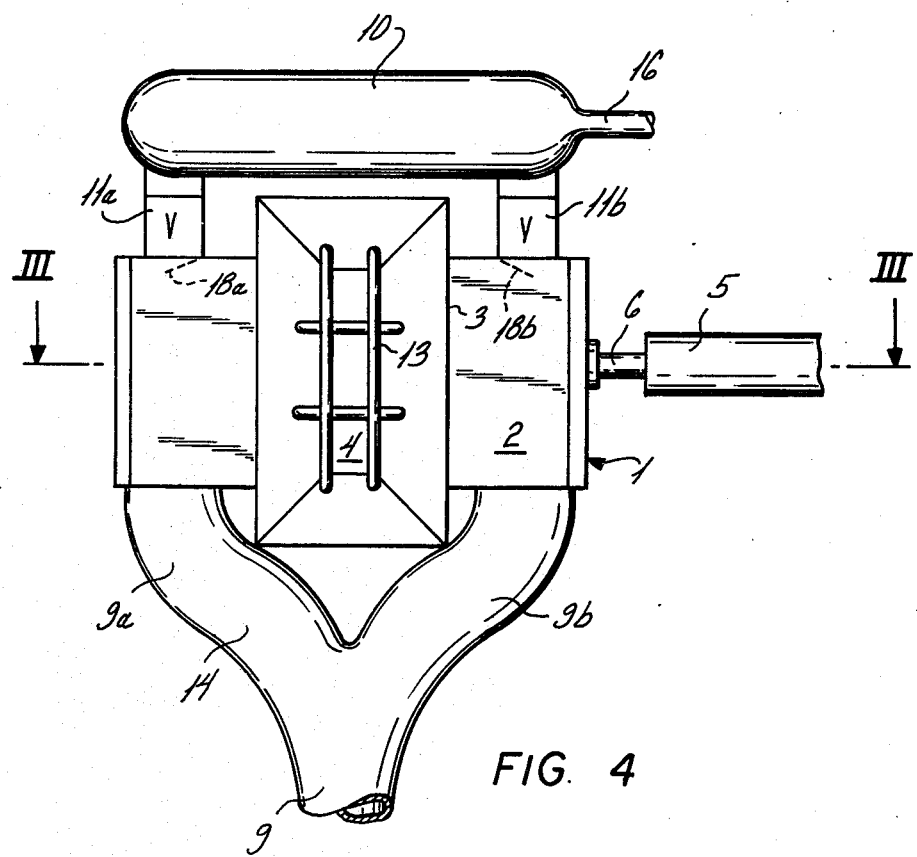

PNEUMATIC STOWING APPARATUS

BACKGROUND OF THE INVENTION

The present invention relates to a pneumatic stowing apparatus especially for filling up dams in an underground mine gallery by blowing mine waste, resulting from blasting operations during advance of the mine gallery, by means of compressed air to a point of use.

It is known for years to transport comminuted mine wastes up to an upper grain size of about 80 mm by compressed air to fill mine galleries from which coal has been removed, to avoid collapse of such mine galleries. Usually machines with rotating cell wheels or a plurality of chambers are used for flinging the mine waste into a chamber of the machine from which the mine waste is subsequently transported by a continuous air stream through a transport conduit to the point of use.

The pneumatic stowing apparatus so far known permit however only transport of relatively small size particles since the individual particles are taken along by the passing air stream and are held during the transport in floating condition.

However, in mining operations there occurs quite often the necessity to transport rough non-comminuted mine waste. This necessity arises usually when the transporting distances are not too long. Such a necessity arises for instance during filling up dams extending along the mine gallery with rough and non-comminuted mine waste, resulting from blasting operations during advance of the mine gallery. Such filling up or stowing of mine waste may be carried out by hand and in some cases a so-called annular chamber jet blower is used. The disadvantage of such a blower consists of its high consumption of compressed air, its very low range of transmission, as well as its high wear.

In addition, backfilling scrapers and band catapults are also used for backfilling of rough mine waste. These known apparatus have however been found unsuitable, due to the great noise connected therewith, their short range of transmission and their exceedingly large wear.

SUMMARY OF THE INVENTION

It is an object of the present invention to provide a pneumatic stowing apparatus which avoids the disadvantages of such apparatus known in the art.

It is a further object of the present invention to provide a pneumatic stowing apparatus by means of which mine waste up to a particle size of 350 mm may be pneumatically transported, without pre-comminuting such mine waste, and in which such rough mine waste can be transported over a considerable distance.

It is a further object of the present invention to provide such a pneumatic stowing apparatus which is of relatively small size, so as to be useable in a mine gallery of small cross-section, which requires for its operation a relatively small amount of compressed air, and in which the wear of the various elements of the apparatus is relatively low, so that the apparatus may be produced at low cost and has a useful life which favorably differs from that of such apparatus known in the art.

With these and other objects in view, which will become apparent as the description proceeds, the pneumatic stowing apparatus according to the present invention, especially for filling up dams in an underground mine gallery by blowing with compressed air rough mine waste resulting from blasting operations during advance of a mine gallery, mainly comprises a substantially closed housing having a top wall provided with an inlet opening and a pair of end walls, each provided with at least one opening aligned with the opening in the other end wall, at least one discharge conduit communicating with the interior of the housing through the opening provided in one of the end walls thereof, a source of compressed air, an air conduit communicating at one end with the source of compressed air and at the other end with the interior of the housing through the opening in the other of the end walls thereof, means forming at least one elongated chamber having opposite open ends adjacent to the aforementioned end walls and being movable in the interior of the housing between a material receiving position in which the chamber is aligned with the inlet opening to receive mine waste passing through the inlet opening, and a discharge position, in which the opposite open ends of the chamber are respectively aligned with the openings in the end walls so that compressed air passing from the source through the air conduit and the opening in the other end wall of the housing will blow the mine waste out of the chamber into the discharge conduit to be transported through the latter to a point of use, means connected to the chamber forming means to move the latter between the positions thereof, and quickly closing valve means in the aforementioned air conduit operable in sequence with the movement of the chamber forming means.

In order to increase the output of the apparatus according to the present invention, the chamber forming means may comprise two transversely spaced chambers connected to each other by a slide and in this case the housing is provided in each of the end walls thereof with two openings also spaced in transverse direction from each other and in which the openings in one of the end walls respectively communicate with discharge conduits and the openings in the other end wall respectively communicate over quickly closing valve means operable in sequence with the movement of the chamber forming means with the source of compressed air.

According to another embodiment of the apparatus according to the present invention, the top wall of the housing is of substantially semi-conical configuration and the chamber forming means, which may comprise a sector shaped element forming two chambers, is tiltable in the housing between the two positions thereof about an axis coinciding with the axis of the top wall. This latter construction permits a better sealing and adjustment of the various elements to compensate for wear.

The improvement of the apparatus according to the present invention, as compared with such apparatus known in the art, consists especially in the reduction of compressed air necessary for the transport of the mine waste due to the opening and closing of the valve in sequence with the movement of the chamber forming means and further in that rough mine waste may be transported by accumulating low pressure air, usually available in mine galleries.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a partially sectioned side view of a second embodiment provided with a double chamber;

FIG. 4 is a top view of the embodiment shown in FIG. 3;

DESCRIPTION OF THE PREFERRED EMBODIMENTS

Figure 1:
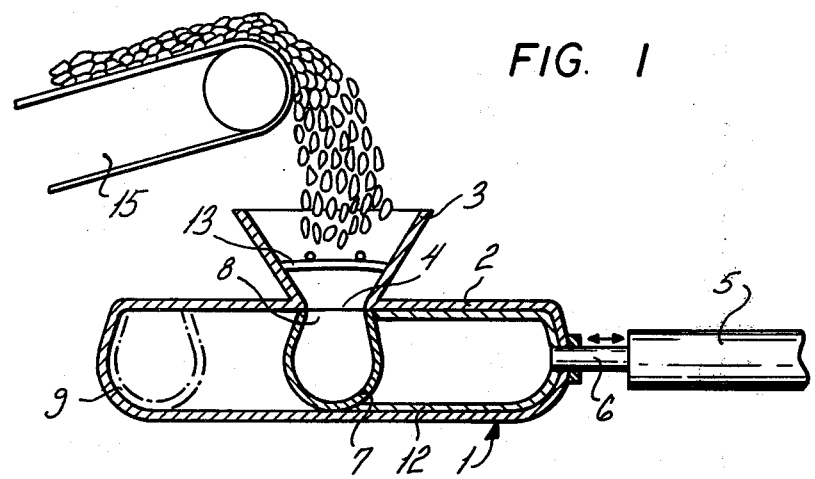
FIG. 1 is a partially sectioned schematic side view of a first embodiment according to the present invention.
Figure 2:
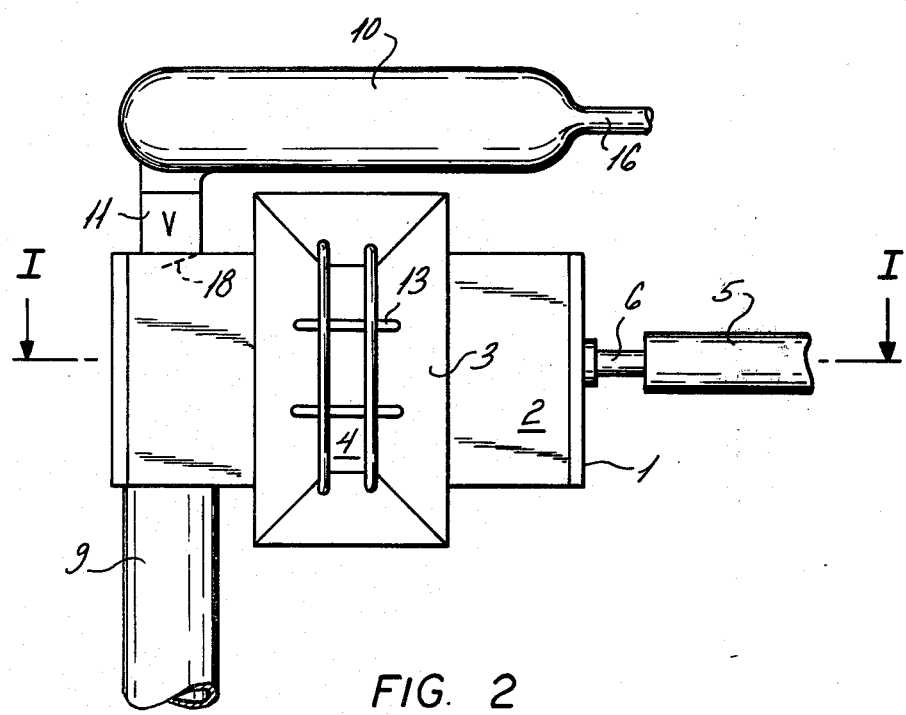
FIG. 2 is a schematic top view of the embodiment shown in FIG. 1.

Referring now to the drawing, and more specifically to FIGS. 1 and 2 of the same, it will be seen that the pneumatic stowing apparatus according to the present invention for transporting rough mine waste may comprise a substantially closed housing 1, having a substantially planar top wall 2 provided between opposite ends thereof with a filling opening 4, from which a funnel 3 projects in upward direction. Chamber forming means forming a chamber 7 of substantiall U-shaped cross section and connected by a box-type slide 12 to the piston 6 of pneumatically or hydraulically operated cylinder and piston means 5, 6, is arranged movable between the full line position of the chamber 7 and the position shown in the dash-dotted lines in FIG. 1. The elongated chamber 7 has an upper opening 8, corresponding in cross section to the filling opening 4 in the top wall 2 of the housing 1. In the position shown in full lines in FIG. 1, the chamber 7 is shown in its material receiving position, in which the opening 8 at the upper end of the chamber is in alignment with the filling opening 4 in the top wall 2 of the housing 1, so that rough mine waste may be filled by transporting means 15, schematically shown in FIG. 1, and through the funnel 3 into the chamber 7. A grate 13 extending transversely through the funnel 3 prevents oversized mine waste particles to enter into the chamber 7.

The chamber 7 connected to the piston 6 of the cylinder and piston means 5, 6 by means of a box-type slide 12, forms with the latter a unit, and the slide 12 closes during movement of the chamber 7 toward the left, as viewed in FIG. 1, the filling opening 4 provided in the top wall of the housing 1. The mine waste continuously transported by the transporting means 15 accumulates, when the filling opening 4 is closed, in the funnel 3 to be discharged therefrom into the chamber 7, when the latter is again moved to the position shown in full lines in FIG. 1.

As indicated in dash-dotted lines in FIG. 1, and as clearly shown in FIG. 2, a discharge conduit 9 communicates through an opening provided in one of the end walls of the housing 1 with the interior of the latter, respectively through one of the open ends in the chamber 7 with the interior of the latter, when the chamber 7 is moved to its discharge position at the left end, as viewed in FIG. 1, in the housing 1. The opposite end wall of the housing is likewise formed with an opening, aligned with the discharge conduit, at which a quickly opening valve 11 is located, which communicates through an air conduit with a source of compressed air, shown in FIG. 2 as a tank for compressed air or air accumulator 10. The tank 10 is connected at its other end by means of a conduit 16 to a source of compressed air at an overpressure of 4 to 5 atmospheres, which is usually available in the mine gallery and which is not illustrated in the drawing. As soon as the chamber 7 reaches its discharge position at the left end, as viewed in FIG. 1, of the housing 1, the valve 11 is opened by means of a contact 18 operated by the wall forming the chamber 7 and compressed air accumulated in the tank 10 enters with a sudden burst through the quickly opening valve 11 of large cross-section into the chamber 7, so as to blow the mine waste therein into the discharge conduit 9. When the chamber 7 moves back again to the position shown in full lines in FIG. 1, the valve 11 is closed and the resulting opening and closing of the valve 11 in sequence with the movement of the chamber 7 will result in a reduced consumption of compressed air.

FIGS. 3 and 4 schematically illustrate a second embodiment according to the present invention, in which the output of the apparatus is increased, as compared with the apparatus shown in FIGS. 1 and 2. The essential difference between the embodiment shown in FIGS. 3 and 4 and the above described embodiment, illustrated in FIGS. 1 and 2, is that in this embodiment two chambers 7a and 7b are provided in the housing 1 transversely spaced from each other and the two chambers are connected to each other by a slide 12 to a single unit. As evident from FIG. 4, two discharge conduits 9a and 9b communicate through corresponding openings provided in one of the end walls of the housing with the interior of the latter in correspondence with the two chambers 7a and 7b. The two discharge conduits 9a and 9b are connected to each other to form a single discharge conduit 9 by a Y-shaped portion 14. In this embodiment the tank 10 is connected at opposite ends with a pair of quickly operating valves 11a and 11b. As shown in full lines in FIG. 3, when the chamber 7a communcates with the filling opening 4 in the top wall 2 of the housing, material in the funnel 3 is fed into the chamber 7a, while the chamber 7b communicates at opposite ends with the valve 11b and the discharge conduit 9b so that compressed air passing through the valve 11b will blow the material in the chamber 7b into the discharge conduit branch 9b. After operating the moving means 5, 6, the chamber 7a is brought to the discharge position, in which the material contained therein is blown out into the discharge conduit 9a, whereas the other chamber 7b is brought to the filling position.

Figure 5:
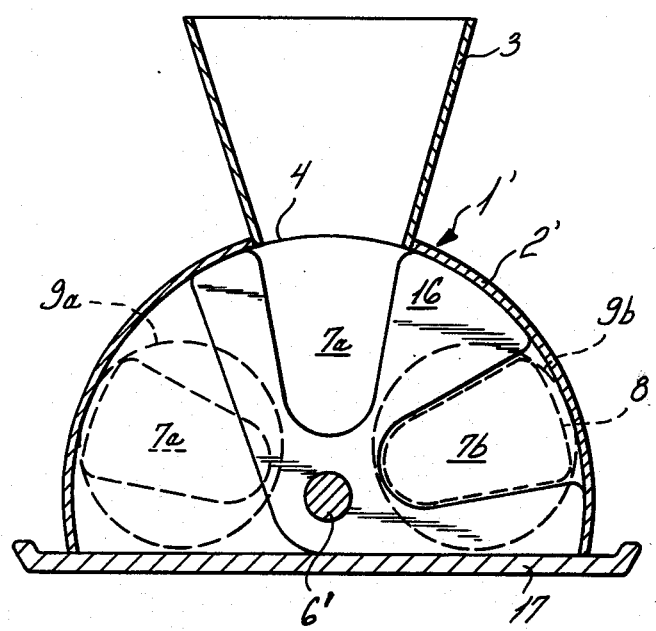
FIG. 5 is a schematic partially sectioned side view of a third embodiment.
Figure 6:
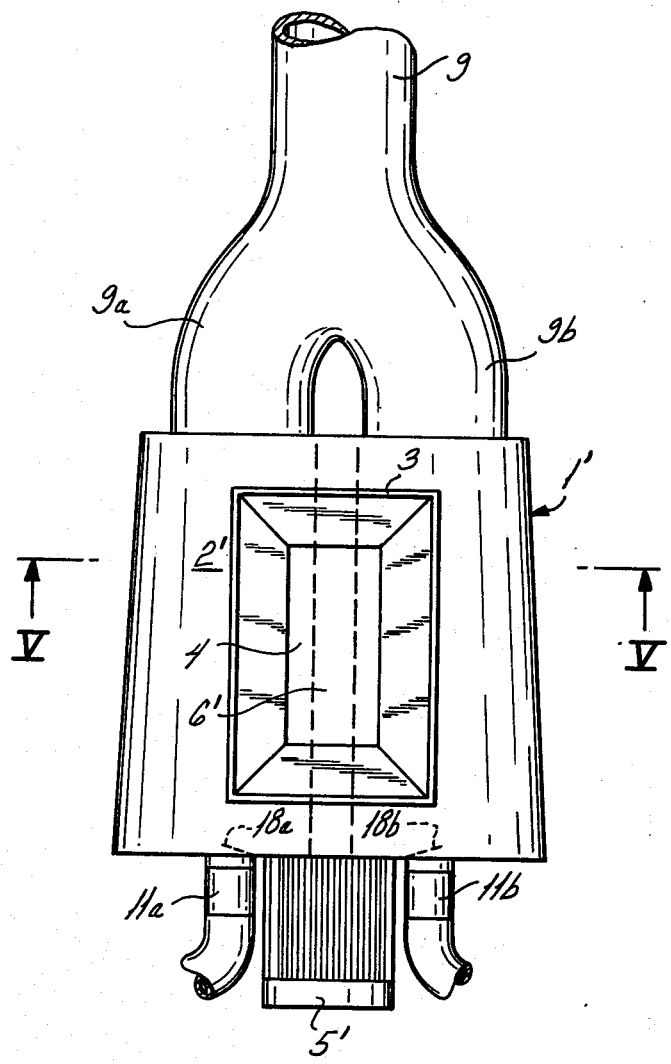
FIG. 6 is a top view of the embodiment shown in FIG. 5.

A third embodiment of the pneumatic stowing apparatus according to the present invention is illustrated in FIGS. 5 and 6. In this embodiment, the top wall 2' of the housing 1' is constructed in longitudinal direction as a semi-conical member and the housing 1' is again provided in the top wall thereof with a filling opening 4, communicating with the lower end of the funnel 3, through which mine waste is fed in the manner as illustrated for instance in FIG. 1. A chamber forming element 16 of sector-shaped cross-section is arranged in the interior of the housing 1' and the outer peripheral surface of the element 16 corresponds in longitudinal direction to the conically tapering inner peripheral surface of the top wall 2' of the housing. Two circumferentially spaced chambers 7a and 7b are formed in the element 16 and the element 16 may be tilted by means of a shaft 6', the axis of which coincides with the axis of the top wall 2' of the housing, between two end positions, in one of which one of the chambers is in the material receiving position and the other of the chambers is in the material discharge position. The chambers 7a and 7b taper toward the shaft 6' and each of the chambers has at the peripheral surface of the element 16 an opening 8 corresponding in cross-section to the inlet opening 4 provided in the top wall of the housing. The cross-section of the sector-shaped element 16 is about two thirds of the cross-section of the housing 1'. As shown in FIG. 5, the housing includes a skit type bottom plate 17.

The outer peripheral surface of the element 16 corresponds to the inner surface of the semi-conical top wall of the housing in such a manner that during wear of the outer peripheral surface of the element 16, such wear may be compensated for by moving the element 16 in longitudinal direction toward the smaller end face of the housing. In order to permit such an adjustment of the element 16 in longitudinal direction a small space is initially maintained between the smaller end face of the element 16 and the corresponding end face at the smaller end of the housing. For this purpose, the element 16 has also to be connected to the shaft 6' for rotation therewith, but movable in longitudinal direction of the latter and such connection may for instance be carried out by a slide key, not shown in the drawing.

The discharge conduits 9a and 9b, shown in dotted lines in FIG. 5, have larger cross-section than that of the chambers 7a and 7b.

In the position shown in full lines in FIG. 5, the chamber 7a is in the filling position and the chamber 7b in the discharge position. After charging of the chamber 7a with the material from the funnel 3 and simultaneous discharging of the material from the chamber 7a into the discharge conduit 9b, the element 16 is tilted in counterclockwise direction about the axis of the shaft 6' by a motor 5' located outside of the housing and connected to the shaft to a position in which the chamber 7a is in the discharge position, communicating with the discharge conduit 9a, and the chamber 7b is in the material receiving position communicating at its upper open end with the filling opening 4 provided at the lower end of the funnel 3.

As shown in FIG. 6 there are provided in the other end wall of the housing two quickly operable valves 11a and 11b, through which compressed air from a tank, not shown in FIG. 6, passes into that chamber which is in the material discharging position. The valves 11a and 11b are again provided with contacts to respectively open and close the valves in sequence with the movement of the element 16.

It will be understood that each of the elements described above, or two or more together, may also find a useful application in other types of pneumatic stowing apparatus differing from the types described above.

While the invention has been illustrated and described as embodied in a pneumatic stowing apparatus especially for filling up dams in an underground mine gallery by blowing rough mine waste resulting from blasting operations with compressed air to a point of use, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essentially characteristics of the generic or specific aspects of this invention.

What is claimed as new and desired to be protected by Letters Patent is set forth in the appended claims:

1. A pneumatic stowing apparatus, especially for filling up dams in an underground mine gallery by blowing rough mine waste resulting from blasting operations during advance of a mine gallery by means of compressed air to a point of use, said apparatus comprising a substantially closed housing having a top wall provided with an inlet opening and a pair of end walls each provided with at least one opening aligned with the opening in the other end wall; at least one discharge conduit communicating with the interior of said housing through the opening provided in one of the end walls thereof; means forming at least one elongated chamber having opposite open ends adjacent to the end walls of said housing and being movable in the interior of said housing between a material receiving position in which said chamber is aligned with said inlet opening to receive mine waste passing through said inlet opening and a discharge position in which said opposite open ends are respectively aligned with said openings in said end walls; means connected to said chamber forming means to move the latter between said positions thereof; and means for blowing off mine waste out of said chamber into said discharge conduit to be transported through the latter to a point of use, said blowing-off means including an air accumulator for accumulating compressed air, an air conduit communicating at one end with one end of said air accumulator and at the other end with the interior of said housing through said opening in the other end wall thereof, quickly opening and closing valve means in said air conduit, and a contact member which is actuated by direct contact with said chamber forming means so as to open and close said valve means in sequence with the movement of said chamber forming means so that in said discharge position of said chamber forming means the latter actuates said contact member whereby said valve means quickly opens and the compressed air accumulated in said air accumulator enters with a sudden burst through said air conduit into said chamber and blows off mine waste out of the latter into said discharge conduit.

2. A pneumatic stowing apparatus as defined in claim 1, and including a funnel projecting upwardly from said top wall of said housing and having a lower open end communicating with said inlet opening.

3. A pneumatic stowing apparatus as defined in claim 2, and including a grate in said funnel above the lower open end thereof.

4. A pneumatic stowing apparatus as defined in claim 1, wherein said top wall of said housing is substantially planar and including a bottom wall substantially parallel to said top wall, and wherein said moving means comprise a cylinder and piston means connected to said chamber forming means for moving the latter between said position thereof in a direction substantially normal to the longitudinal direction of the chamber formed by said chamber forming means.

5. A pneumatic stowing apparatus as defined in claim 4, wherein said chamber forming means includes a box-shaped slide in said housing connecting the chamber formed by the chamber forming means with said piston and cylinder means.

6. A pneumatic stowing apparatus as defined in claim 1, wherein said top wall of said housing is in longitudinal direction of substantially semi-conical configuration, and wherein said chamber forming means is tiltable between the positions thereof about an axis coinciding with the axis of the top wall.

7. A pneumatic stowing apparatus as defined in claim 6, wherein said at least one opening in one of the end walls of the housing through which said at least one discharge conduit communicates with the interior of said housing has a cross section which is greater than that of one of said open ends of said chamber, which is adjacent said one end wall.

8. A pneumatic stowing apparatus as defined in claim 6, wherein said semi-conical top wall of said housing is mounted on a skit type bottom plate.

9. A pneumatic stowing apparatus as defined in claim 6, and including a shaft extending along said axis, said chamber forming means being connected to said shaft for tilting movement therewith, and including a motor located outside of said housing and connected to said shaft for oscillating the same about said axis.

10. A pneumatic stowing apparatus as defined in claim 1, wherein the chamber formed by the chamber forming means has a substantially U-shaped cross-section and a filling opening of a cross-section substantially identical to that of said inlet opening.

11. A pneumatic stowing apparatus as defined in claim 1, wherein said chamber forming means comprises two transversely spaced chambers connected to each other by a slide, and wherein said housing is provided in each of the end walls thereof with two openings spaced in transverse direction from each other, with the openings in one of the end walls respectively aligned with the openings in the other end wall, and wherein said chamber forming means is movable between two end positions, in one of which one of said chambers is aligned with said inlet opening in the top wall of said housing and the opposite open ends of the other chamber are respectively aligned with one of a pair of aligned openings in said end walls and in the other of said end positions the other of the chambers is aligned with said inlet opening and the opposite ends of said one chamber are respectively aligned with the other pair of aligned openings in said end walls, a discharge conduit for each opening in one of said end walls and an air conduit for each opening in the other of the end walls, quick opening and closing valve means in each of said air conduits, and a contact member actuated by direct contact with the respective chamber forming means so as to open and close the respective valve means in sequence with the movement of said chamber forming means.

12. A pneumatic stowing apparatus as defined in claim 11, wherein the discharge conduit at one of said openings of said one end wall is combined in form of a Y-conduit with the discharge conduit at the other opening at said one end wall.

13. A pneumatic stowing apparatus as defined in claim 1, wherein said quickly opening valve means has a large flow through cross-section and said contact member is located in the path of movement of the chamber forming means to be actuated by the latter during movement of said chamber forming means.

14. A pneumatic stowing apparatus, especially for filling up dams in an underground mine gallery by blowing rough mine waste resulting from blasting operations during advance of a mine gallery by means of compressed air to a point of use, said apparatus comprising a substantially closed housing having a top wall provided with an inlet opening and being in longitudinal direction of substantially semi-conical configuration, said housing having a pair of end walls each provided with at least one opening aligned with the opening in the other end wall; at least one discharge conduit communicating with the interior of said housing through the opening provided in one of the end walls thereof; a source of compressed air; an air conduit communicating at one end with said source and at the other end with the interior of said housing through said opening in the other of the end walls thereof; means forming at least one elongated chamber having opposite open ends adjacent to the end walls of said housing and being tiltable in the interior of said housing about an axis coinciding with the axis of the top wall between a material receiving position in which said chamber is aligned with said inlet opening to receive mine waste passing through said inlet opening and a discharge position in which said opposite open ends are respectively aligned with said openings in said end walls so that compressed air passing from said source through said air conduit and said opening in the other end wall of said housing will blow mine waste out of said chamber into said discharge conduit to be transported through the latter to a point of use, said chamber forming means being in form of a sector shaped element having a cross-section substantially equal to two thirds of the cross-section of the housing; means connected to said chamber forming means to move the latter between said positions thereof; and quickly opening valve means in said air conduit operable in sequence with the movement of said chamber forming means.

15. A pneumatic stowing apparatus as defined in claim 14, wherein two circumferentially spaced chambers are formed by said chamber forming means each of which tapers toward said axis and each having an outer open end of a cross-section corresponding to that of said inlet opening in said top wall of said housing.

* * * * *